United States Patent Office 3,439,770
Patented Apr. 22, 1969

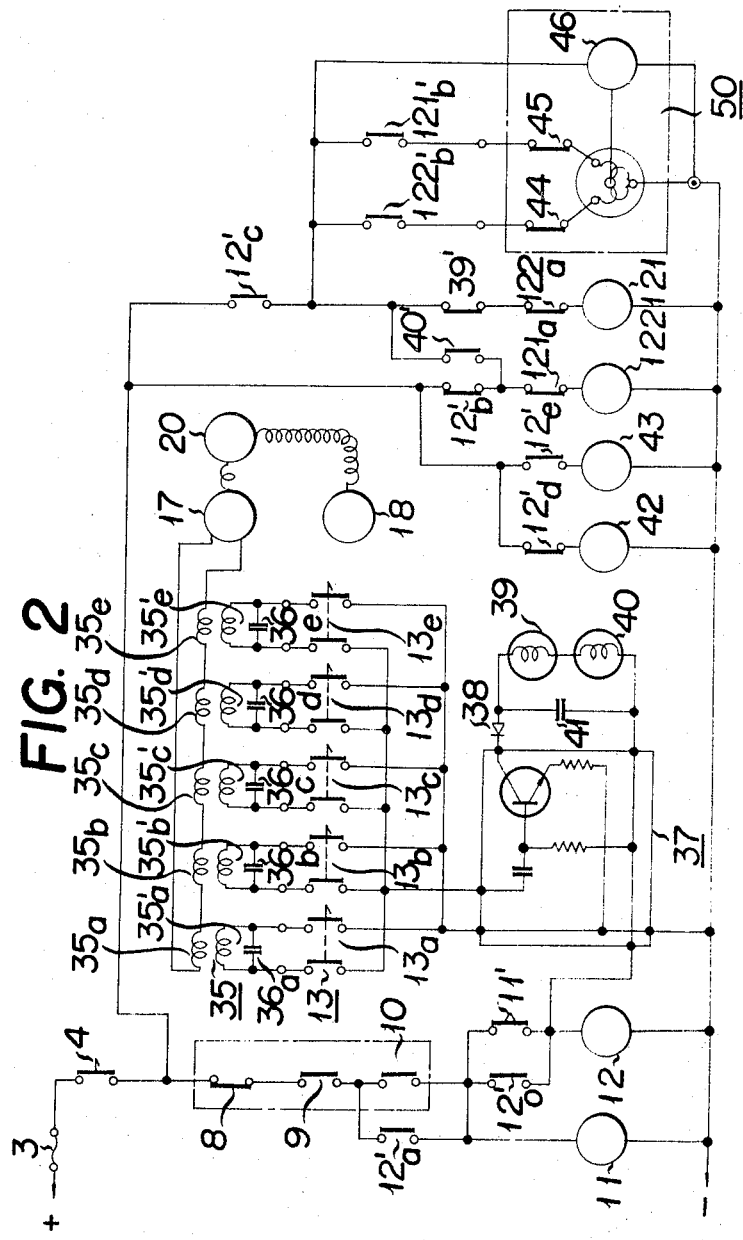

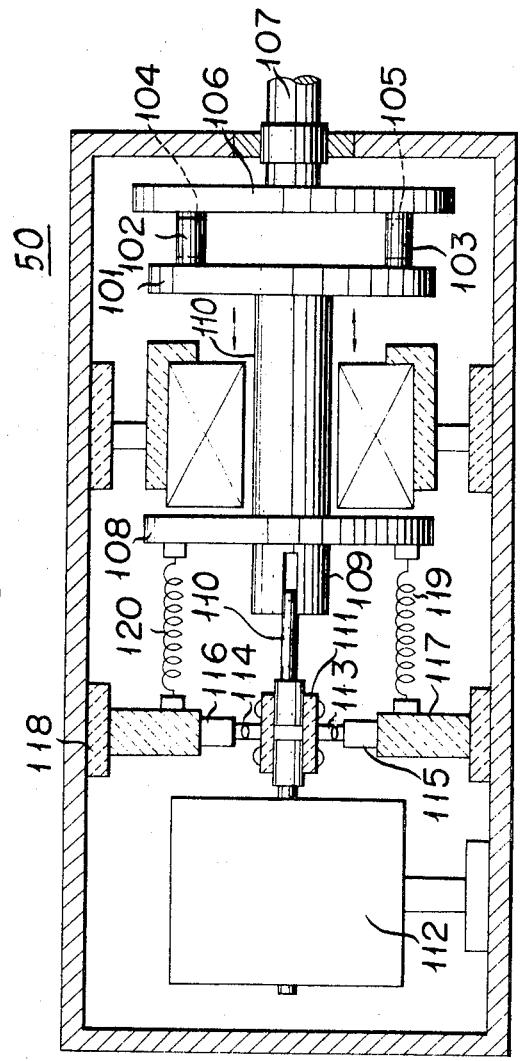

3,439,770
CONSTANT SPEED DRIVE CONTROL SYSTEM
FOR AUTOMOBILES
Hikotaro Saito, 1989—3 Kumisawa-cho, Totsuka-ku,
Yokohama-shi, Japan
Filed Mar. 23, 1967, Ser. No. 625,515
Int. Cl. B60k 31/00
U.S. Cl. 180—105                                    2 Claims

ABSTRACT OF THE DISCLOSURE

A constant speed drive control system for automobiles which enables driving a motor car at a desired constant speed regardless of geometry of the ground and whether the car is loaded or unloaded only by placing the change gear in the high-speed position until the brake is operated.

This invention relates to a constant speed drive control system for automobiles which enables driving a motor car at a desired constant speed regardless of geometry of the ground and whether the car is loaded or unloaded only by placing the change gear in the high-speed position until the brake is operated.

Heretofore, in driving motor cars change gear should be operated to shift gears from low to second or to top or in the reverse manner in the course of driving, depending upon road conditions. However, it is often desirable to drive the car at a constant speed at all times.

An object of this invention is to provide a constant speed drive control system for motor cars which permits driving the car equipped with it only by placing the change gear in the high-speed position and manipulating a button corresponding to a desired driving speed and without operating the accelerator afterwards until the operation of the brake is made.

The invention is now described in conjunction with some embodiments thereof with reference to the drawings, in which:

FIG. 2 is a circuit diagram of a specific part of the system of FIG. 1; and

FIG. 3 is a schematic representation illustrating parts in FIG. 2.

Figure 1:
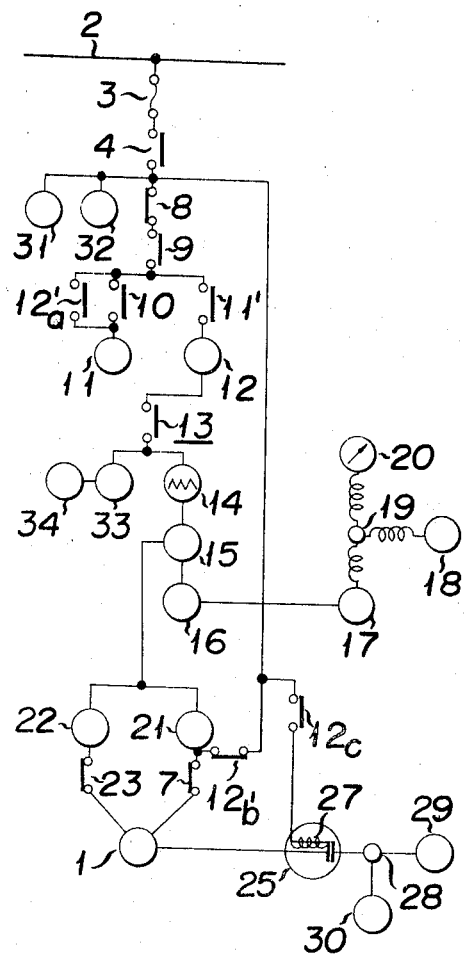
FIG. 1 is a schematic diagram illustrating a constant speed drive control system embodying the invention.

Referring now to FIG. 1, a speed control motor 1 is connected to power line 2 through a fuse 3, a main control switch 4, a normally closed contact 12b' and a limiting switch 7 all connected in series in the mentioned order. To the connection line between the main control switch 4 and the normally closed contact 12b' is connected one end of a brake circuit switch 8 whose other end is connected to a time limit relay 11 via a normally open contact 9 which is closed when gears are shifted to the high-speed position and a normally open contact 10 which is closed on operation of the accelerator. The end of the normally open contact 9 opposite the end in connection with the brake circuit switch 8 is connected to a speed select switch 13 through a normally open contact 11' which is controlled by the excitation of the time limit relay 11 and an auxiliary relay 12. To the ends of the normally open contact 10 is connected a parallel normally open contact 12a' which is controlled by the excitation of the auxiliary relay 12. The normally open contact 12'a serves for the self-maintenance of the time limit relay 11.

The speed select switch 13 is connected to a balancing relay 15 through a bobbin-type variable resistor 14. The balancing relay 15 may be a detecting apparatus for detecting the frequency of output from an A.C. generator by means of a resonance circuit. The balancing relay 15 is supplied with a voltage from a potentiometer 16 which is controlled by a voltage from an A.C. generator 17 which is driven by an output from the engine 18 which output is also transmitted to a speedometer 20 through T-type gear 19.

Accordingly, the balancing relay 15 is applied with a voltage which is proportional to the car speed. In this balancing relay 15 the instantaneous car speed and the selected car speed are compared with each other and if there is any difference between them either an acceleration relay 21 or a deceleration relay 22 is actuated. The deceleration relay 22 is connected to the speed control motor 1 through a limiting switch 23. To the speed control motor 1 is connected a clutch 25 which is connected to a carburetter 29 side by the excitation of a coil 27 when the normally open switch 12c is closed upon closure of the main control switch 4. The clutch 25 controls the carburetter 29 through a T-type gear 28 which is provided to an accelerator 30. To the connection line between the main control switch 4 and the brake circuit switch 8 are connected an actuating relay 31 for the control motor 1 and a pilot lamp 32. To the connection line between the speed select switch 13 and the variable resistor 14 is an auxiliary generator relay 34 through a pilot lamp 33.

Further, in FIG. 1, commands for acceleration and deceleration are made according to the output of a balancing relay 15 by which an output determined by the speed selection switches 13 and the variable resistor 14 and the output from the A.C. generator which corresponds to the speed of travel of the car are compared. However, the command generating device according to this invention is not limited to the use of the balancing relay 15, but may utilize a meter relay, or, as shown in FIG. 2, a plurality of tuning coils corresponding to the predetermined speed selections in which acceleration or deceleration commands are generated through the amplifier connected to a selected coil of said tuning coils only when the tuning frequency of said selected coil is of such a value that is other than the output frequency from said A.C. generator 17.

In FIG. 2 is shown a circuit embodying the invention more in detail. In FIG. 2 same parts as in FIG. 1 are indicated by same reference numerals, and their detailed description is omitted.

In the embodiment illustrated in FIG. 2, a plurality of coils, namely a first row of coils 35a, 35b, 35c, 35d and 35e, which correspond to predetermined speed indications are serially connected to the output terminal of the A.C. generator 17. To a plurality of said coils are respectively connected a plurality of a second row of coils 35a', 35b', 35c', 35d' and 35e' which are in parallel relationships with each other and which are further connected in parallel with capacitors 36a, 36b, 36c, 36d and 36e, thereby to constitute a tuning circuit 35. To both terminals of a plurality of said capacitors are connected speed selection switches 13a, 13b, 13c, 13d and 13e. These speed selection switches generally indicated by 13 are set to correspond to a desired number of predetermined speed selections, for example, 40, 60, 80, 100 and 120 miles per hour. The speed selection switches 13 are collectively connected to the input terminal of an amplifier 37. To the output terminal of the amplifying circuit 37 is serially connected a series circuit consisting of a rectifier 38 of the polarity shown, a first acceleration relay 39, and a first deceleration relay 40. The power terminal of the amplifier 37 is connected to both ends of the auxiliary relay 12. Between the junction of the rectifier 38 and the first acceleration relay 39, and that of the first deceleration relay 40 and one of the output terminals of the amplifier 37 is connected a smoothing capacitor 41.

Between the junction of the main control switch 4 and the brake switch 8 and one terminal of the auxiliary relay 12 is connected a first series circuit comprising a normally closed contact 12b', a further normally closed contact 121a and a deceleration relay 122, which are respectively switch controlled by said auxiliary relay 12. To said series circuit is connected in parallel a second series circuit comprising the normally closed contact 12c' controlled by said auxiliary relay 12, a normally closed contact 39' controlled by said first acceleration relay 39, a normally closed contact 122a controlled by said second deceleration relay 122, and a second acceleration relay 121. Between the junction of the normally open contact 12c' and the normally closed contact 39' of the second series circuit and that of the normally closed contacts 12b' and 121a of the first series circuit is connected a normally open contact 40' controlled by the first acceleration relay 40.

To said first series circuit are connected in parallel a series circuit comprising a normally open contact 12e' and an indicator lamp 43 and a series circuit comprising a normally closed contact 12d' and an indicator lamp 42. Also, between the junction of said normally open contact 12c' and the normally closed contact 39', and the other end of said second acceleration relay 121 is connected a speed regulator 50 through a normally open contact 122b' controlled by the second deceleration relay 122 and a normally open contact 121b' controlled by the second acceleration relay 121 and connected in parallel with said normally open contact 122b'. In the figure, the reference numerals 44 and 45 indicate limit switches. The numeral 46 designates a speed regulator actuating device which is connected to the motor 1 and actuates the valve of the carburretter through a clutch of electromagnetic mechanism so as to accelerate or decelerate a car.

FIG. 3 illustrates a preferred arrangement of the speed regulator device 50 wherein a movable member 100 includes a plate member 101 at one end thereof. A pair of confronting projections 102 and 103 are mounted on said plate member 101. A plate member 106 has projections 104 and 105 to support the projections 102 and 103 and the clutch mechanism is formed by the plate members 101 and 106. The plate member 106 is engaged with an axis 107 which in turn is engaged with a valve of a carburretter not shown. A plate member 108 located at the opposite end of said movable body 100 has a projection shaft 109 mounted thereon and further a shaft 110 is splinedly connected to a long groove formed in the axis of the projection shaft 109. The shaft 110 is connected to the shaft of a motor by means of a coupling 111. The coupling 111 has projections 113 and 114. Limit switches 115 and 116 are supportedly mounted on supporting members 117 and 118 at positions where said projections 113 and 114, when the motor 112 is rotated at a predetermined angle, pressedly engage contact pieces of said limit switches. Between one of the plate bodies 108 and said supporting members 118 and 117 are extendedly connected springs 119 and 120.

About the shaft of said movable member 100 are wound coils with predetermined spacings. The coils serve as an electromagnet. In FIG. 3, the movable body 100 is shown as being attracted to the right hand side after the electromagnet has been energized. And the shaft 107 can be rotated in a desired direction, viz. in a direction for effecting acceleration or deceleration, by being engaged with the clutch mechanism. When the electromagnet is deenergized, the movable body 100 is pulled in the left hand direction by means of the springs 119 and 120 to free the clutch so that the speed of the car can be set at an optional speed without the influence of the automatic driving device.

The invention will now be described with reference to FIG. 2 in connection with one embodiment thereof. When the main control switch 4 is closed and its contact 10 is closed by pushing an accelerator when the top-gear contact 9 is closed, the time limit relay 11 will be excited. This time limit relay 11 is arranged to be controlled with a time lag ranging from 30 to 60 seconds. The normally open contact 11' is closed by the excitation of the time limit relay 11 and hence the auxiliary relay 12 is excited. The excitation of the auxiliary relay 12 causes the normally open contact 12a' to close. The provision of the time limit relay 11 effecting a time lag is intended so that the control circuit may be operated thereby to assure safety when the speed of the car becomes a desired one after the pushing operation of the accelerator.

When it is desired that the car runs at a fixed speed, for example, 80 miles per hour, the speed selection switch 13c corresponding to 80 miles per hour is pushed together for connection. When the output frequency from the A.C. generator 17 is of desired value, owing to the action of the tuning circuit corresponding to said switch 13c, i.e. the coils 35, 35c and the capacitor 36c, its tuning is obtained and no output is generated from the amplifier 37, so that the first deceleration relay 40 or the first acceleration relay 39 is inoperative. When, however, the speed of the car is increased above 80 miles per hour, the output frequency from the A.C. generator 17 will be increased in proportion to the amount of the speed increased. Thus, the magnitude of the current from the amplifier circuit 37 is increased, whereby the excitation coil of the deceleration relay 40 is excited and rendered operative. Simultaneously therewith, the excitation coil of the acceleration relay 39 is excited and its movable contact piece is caused to be attracted thereto. This attraction of the movable contact piece, however, will make inoperative the contact which is controlled by the first acceleration relay 39. Due to the action of the first deceleration relay 40, the normally open contact 40' is closed thus exciting the second deceleration relay 122. Accordingly, the normally open contact 122b' is closed, the speed regulator 50 becomes operative, and the velocity of rotation of the engine 18 is controlled to be decreased by said speed regulator actuating device 46. As a result the second acceleration relay 121 does not operate since the normally closed contact 39' is released. On the other hand, when the speed is decreased to a less value than desired one, an output frequency less than the frequency to be tuned is made the input of the amplifier 37, and an amount of output current corresponding to said input flows into the output circuit of the amplifier 37. For this reason, the first deceleration relay 40 is not rendered operative. However, since the first acceleration relay 39 is inoperative and the normally closed contact 39' is maintained in its closed position, and the second acceleration relay 121 is excited. Upon excitation of the acceleration relay 121, the normally open contact 121b' is closed, thereby causing the speed regulator 50 to be operative, with the result that the rotation of the motor 18 is reversed.

By keeping in a close position the speed selection switch 13 which corresponds to a predetermined speed, the acceleration or deceleration relay is automatically operated according to the variation of the output frequency from the A.C. generator, and the speed of the car is controlled to return to a predetermined level of speed. Thus, the car according to this invention is capable of running always at a constant speed regardless of the geographical condition of land on which the car travels and whether it is loaded or unloaded. Also if the brake is worked the moment any obstacle is found ahead, the brake switch 8 is released, thereby automatically opening said control circuit. This enables safe constant speed drive control to be carried out.

What is claimed is:

1. A constant speed drive control system for an automobile comprising:
   a main control switch (4) one end of which is connected to power line (2) through a fuse (3) and the other end of which is connected to a series circuit including a brake switch (8), a normally open contact (9) being closed when the change gear of said automobile is shifted to top, and a further normally open contact (10) being closed when the accelerator of said automobile is pushed;

a time limit relay (11) one end of which is connected to said further contact (10) at its one end opposite to said contact (9), which has a normally open contact (11') having its one end connected to the opposite end of said further contact (10), and which is operative after the accelerator has been continuously operated for a certain period of time;

an auxiliary relay (12) one end of which is connected to the other end of said contact (11') of said time limit relay (11);

an A.C. generator (17) which is directly connected with the engine of said automobile and generates an output corresponding to the actual speed of said automobile and which is provided with a plurality of coils (35a, 35b, 35c, 35d and 35e) connected in series across the output terminals of said A.C. generator (17) and corresponding in number to the number of desired speeds to be selected;

means for speed selection including the same number of tuning circuits (35) and speed selection switches (13) as said coils (35a–35e), said tuning circuits each consisting of a parallel circuit including a coil and a capacitor and respectively being arranged in parallel with one another, said speed selection switches each being connected to both terminals of the capacitor of the corresponding tuning circuit of said each speed selection switch;

a commander device for generating a command of acceleration and deceleration, which includes relay circuits connected to said speed selection means and operated according to variation in amount of current, said variation corresponding to a difference between the tuning frequency supplied from one of the tuning circuits and the output frequency supplied from said A.C. generator; and a device which is controlled by operation of said auxiliary relay and which controls the speed of travel of said automobile.

2. The constant speed drive control system for automobiles according to claim 1 wherein the device for controlling the speed of travel of the car according to the command from said command generating device comprising an electromagnet excited by a control current determined by the output of said command generating device, a movable body movable by being excited and controlled by said electromagnet, means clutchedly connected to one end of said movable body and which controls the closure of the valve of said carburetter, and is capable of accelerating the speed of the car above a predetermined speed during automatic driving of the car, a motor splinedly engaged with said movable body at its opposite end, a spring means for releasing the clutch engagement when the electromagnet is deenergized and which returns the movable body to its initial position, and a limiting switch for controlling the rotative angle of said motor.

References Cited

UNITED STATES PATENTS

| | | | |
|---|---|---|---|
| 2,236,145 | 3/1941 | Kolb | 180—110 X |
| 2,637,014 | 4/1953 | Stallard. | |
| 2,971,596 | 2/1961 | Davis et al. | 180—109 |
| 3,060,602 | 10/1962 | Buttenhoff | 180—105 X |
| 3,116,807 | 1/1964 | Wilson | 180—109 |
| 3,133,610 | 5/1964 | Sheppard | 180—108 |
| 3,195,671 | 7/1965 | Wolfe | 123—102 X |
| 3,344,880 | 10/1967 | Iwashita et al. | 180—109 |
| 3,368,639 | 2/1968 | Deane | 180—108 X |
| 3,381,771 | 5/1968 | Granger et al. | 180—108 X |

KENNETH H. BETTS, *Primary Examiner.*

U.S. Cl. X.R.

123—103